(12) United States Patent
Sherman et al.

(10) Patent No.: US 9,491,448 B2
(45) Date of Patent: Nov. 8, 2016

(54) LASER VIDEOGRAMMETRY

(71) Applicant: The Boeing Company, Chicago, IL (US)

(72) Inventors: William D. Sherman, Lacey, WA (US); Mitchell Voth, Lake Tapps, WA (US); Jonathan Saint Clair, Seattle, WA (US)

(73) Assignee: The Boeing Company, Chicago, IL (US)

( * ) Notice: Subject to any disclaimer, the term of this patent is extended or adjusted under 35 U.S.C. 154(b) by 348 days.

(21) Appl. No.: 13/854,844

(22) Filed: Apr. 1, 2013

(65) Prior Publication Data

US 2014/0293023 A1    Oct. 2, 2014

(51) Int. Cl.
*G01B 11/245* (2006.01)
*G01C 11/00* (2006.01)
*G01B 11/00* (2006.01)
*G01C 15/00* (2006.01)
*H04N 13/04* (2006.01)

(52) U.S. Cl.
CPC ......... *H04N 13/0459* (2013.01); *G01B 11/002* (2013.01); *G01B 11/245* (2013.01); *G01C 11/00* (2013.01); *G01C 15/002* (2013.01)

(58) Field of Classification Search
CPC .......... H04N 13/0459; G06T 2200/04; G01C 11/00; G01C 15/002; G01B 11/002; G01B 11/245
USPC ...................................... 348/54, 94, E07.085
See application file for complete search history.

(56) References Cited

U.S. PATENT DOCUMENTS

| | | | |
|---|---|---|---|
| 3,868,478 A | 2/1975 | Zeenkov | |
| 4,989,981 A * | 2/1991 | Kawamura | .......... G01B 11/002 356/394 |
| 5,402,364 A | 3/1995 | Kitoh et al. | |
| 5,805,289 A | 9/1998 | Corby, Jr. et al. | |
| 6,166,809 A | 12/2000 | Pettersen et al. | |

(Continued)

FOREIGN PATENT DOCUMENTS

EP      2642246 A    9/2013

OTHER PUBLICATIONS

Wikipedia, Videogrammetry https://en.wikipedia.org/wiki/Videogrammetry [Jun. 18, 2015 10:14:24 AM].*

*Primary Examiner* — Richard Torrente
*Assistant Examiner* — Marnie Matt
(74) *Attorney, Agent, or Firm* — Duft Bornsen & Fetting LLP (57) ABSTRACT

Systems and methods for measuring a surface of an object. The system, in one embodiment, includes a laser projector device mounted at a fixed location relative to an object being formed by a fabrication process, and a videogrammetry device mounted at another fixed location relative to the object. The laser projector device includes a laser element mounted on a two-axis gimbal assembly, and the gimbal assembly directs laser beams from the laser element onto target points on a surface of the object. The laser projector device measures angles of the laser beams to the target points, while the videogrammetry device simultaneously performs measurements of the target points by capturing video images of the laser beams reflecting off of the target points. A controller processes the measurements from the laser projector device and the videogrammetry device to calculate x, y, z coordinates of the target points in a 3D coordinate system.

18 Claims, 5 Drawing Sheets

(56) References Cited

U.S. PATENT DOCUMENTS

| | | | |
|---|---|---|---|
| 7,454,265 B2 | 11/2008 | Marsh | |
| 7,800,758 B1* | 9/2010 | Bridges | G01B 11/002 356/482 |
| 7,965,396 B2 | 6/2011 | Ashford et al. | |
| 2003/0048459 A1* | 3/2003 | Gooch | G01B 11/2545 356/620 |
| 2007/0089309 A1* | 4/2007 | Kodaira | G01C 15/002 33/290 |
| 2007/0263229 A1* | 11/2007 | Marsh | G01B 11/002 356/601 |
| 2007/0265728 A1 | 11/2007 | Marsh et al. | |
| 2009/0112101 A1* | 4/2009 | Furness, III | G01J 3/02 600/477 |
| 2010/0149525 A1* | 6/2010 | Lau | G01B 11/002 356/139.03 |
| 2010/0274390 A1 | 10/2010 | Walser et al. | |
| 2013/0250094 A1* | 9/2013 | Rueb | G01C 11/00 348/94 |
| 2014/0028805 A1 | 1/2014 | Tohme | |
| 2014/0148939 A1* | 5/2014 | Nakano | G01B 11/2545 700/166 |
| 2015/0009493 A1 | 1/2015 | Kwiatkowski | |

* cited by examiner

LASER VIDEOGRAMMETRY

FIELD

This disclosure relates to the field of fabrication, and more particularly, to measuring surfaces of objects during fabrication processes.

BACKGROUND

When manufacturing products, such as aircraft for example, some of the parts (referred to herein as "objects") of the product are fabricated to have desired shape. Fabrication of objects may include processes such as bending, rolling, pressing, etc., that are used to form a desired contour on a surface of the object. For example, a sheet of material for a fuselage section or wing section of an aircraft may be pressed or otherwise formed until an inner or outer surface of the material has a desired contour. During the fabrication process, it may be desirable to periodically measure a surface of the object so that the object's final shape is exact as possible. One way to measure an object's surface is with photogrammetry. In photogrammetry, a camera captures images of a surface, and the images are processed to determine an object's geometry. Another way to measure the shape of an object's surface is with a laser projector. A laser projector uses a laser device to reflect laser beams off of different points along a surface of an object, and measures the angles for each of the points.

When measuring the surface of large objects, such as a fuselage or wing section of an aircraft, traditional photogrammetry or laser projector techniques may be too slow. This unfortunately slows down the overall manufacturing process. Therefore, manufacturers continue to look for ways to efficiently measure large surfaces so that production timelines can be met.

SUMMARY

Embodiments described herein provide an improved way of measuring surfaces of large objects during fabrication processes. A laser projector device and a videogrammetry device simultaneously measure the surface of an object, such as after an initial or intermediate step of a fabrication process. As the laser projector device performs measurements by directing laser beams at target points on the surface, the videogrammetry device is able to capture a video image of the laser beams reflecting off of the surface. Thus, the videogrammetry device is able to identify where the laser beams from the laser projector device intersect with the surface of the object. Angle measurements from both the videogrammetry device and the laser projector device may then be used to model the surface of the object in a 3D coordinate system. If the contour of the object's surface matches a desired contour for the object, then the fabrication process is complete. If the contour of the object's surface deviates from the desired contour by a threshold amount, then the fabrication process continues to form the surface of the object. Surface measurements may continue after one or more additional steps of the fabrication process until the surface of object has a desired contour.

One embodiment comprises a system for measuring the surface of an object being formed by a fabrication process. The system includes a laser projector device mounted at a first fixed location relative to the object, and a videogrammetry device mounted at a second fixed location relative to the object. The laser projector device includes a laser element mounted on a two-axis gimbal assembly. The laser projector device is configured to control the two-axis gimbal assembly to direct laser beams from the laser element onto target points on a surface of the object, and to measure angles of the laser beams from the laser element to the target points. The videogrammetry device is configured to simultaneously perform measurements of the target points by capturing video images of the laser beams reflecting off of the target points. A controller is configured to process the measurements from the laser projector device and the videogrammetry device to calculate x, y, z coordinates of the target points in a 3D coordinate system.

Another embodiment includes a method of measuring the surface of an object being formed by a fabrication process. The method includes the step of directing laser beams onto target points on the surface of the object with a laser projector device, where the laser projector device is mounted at a first fixed location relative to the object. The method further includes measuring angles of the laser beams from the laser projector device to the target points. The method further includes simultaneously performing measurements of the target points with a videogrammetry device by capturing video images of the laser beams reflecting off of the target points. The videogrammetry device is mounted at a second fixed location relative to the object. The method further includes processing the measurements from the laser projector device and the videogrammetry device to calculate x, y, z coordinates of the target points in a 3D coordinate system.

Another embodiment comprises a measurement system configured to measure the surface of an object being formed by a fabrication process. The measurement system includes a laser projector device mounted at a first fixed location relative to the object to perform measurements of target points on the surface of the object. The measurement system further includes a videogrammetry device mounted at a second fixed location relative to the object to perform measurements of the target points on the surface of the object. The measurement system further includes a controller configured to process the measurements performed by the laser projector device and the videogrammetry device to calculate x, y, z coordinates of the target points in a 3D coordinate system. The controller is configured to compare the x, y, z coordinates of the target points in the 3D coordinate system with a digital blueprint of the object, and to provide an indication for the fabrication process to continue on the object if the x, y, z coordinates of the target points deviate from the digital blueprint by more than a threshold amount.

The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present invention are now described, by way of example only, and with reference to the accompanying drawings. The same reference number represents the same element or the same type of element on all drawings.

DESCRIPTION

The figures and the following description illustrate specific exemplary embodiments. It will thus be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific embodiments or examples described below, but by the claims and their equivalents.

Figure 1:
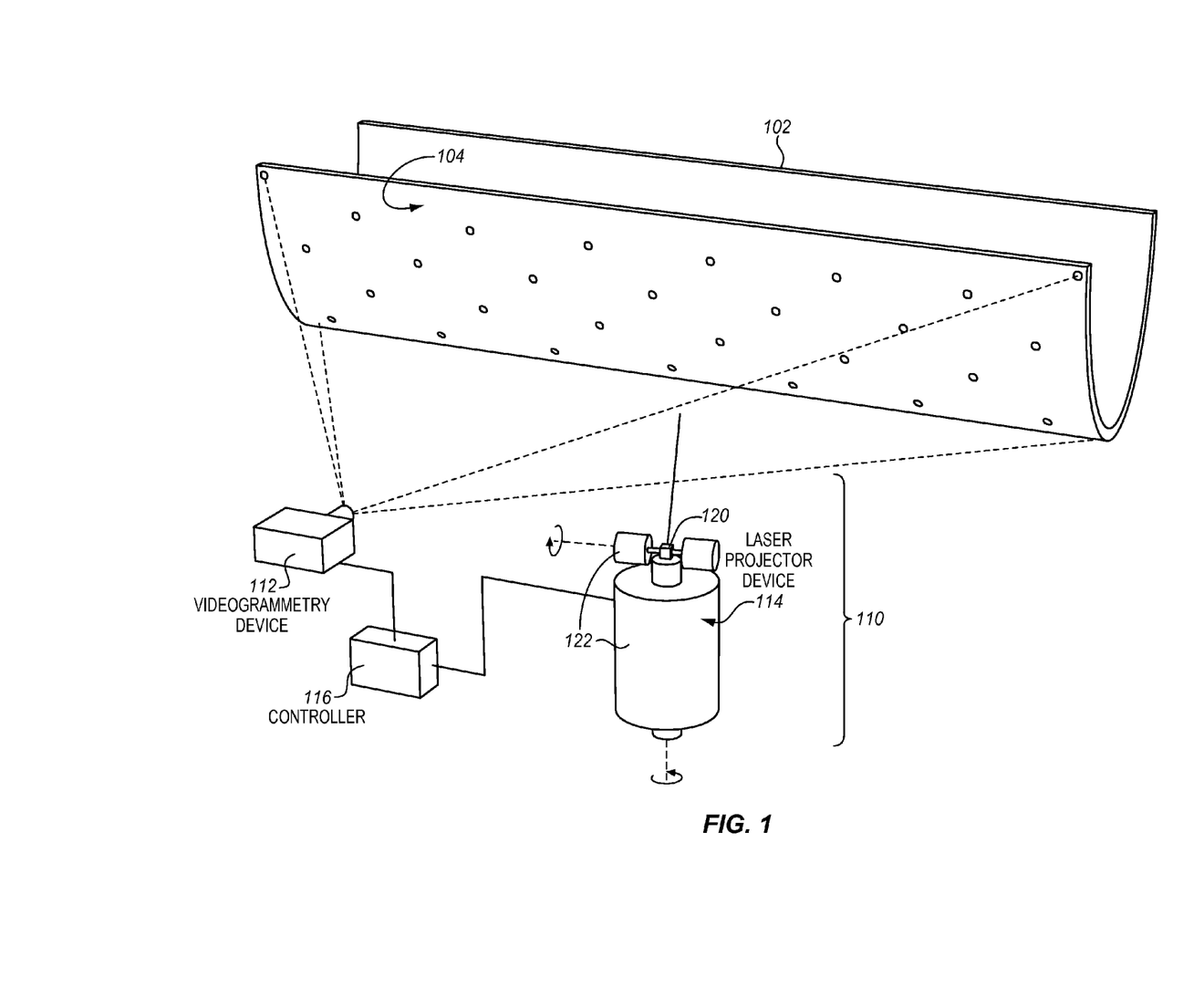
FIG. 1 illustrates a measurement system for a fabrication process in an exemplary embodiment.

FIG. 1 illustrates a measurement system for a fabrication process in an exemplary embodiment. The fabrication process as described herein is used to form, bend, or otherwise shape a contour on a surface 104 of object 102. For example, object 102 may be a sheet of material, such as sheet metal, that is being bent, pressed, rolled, or otherwise formed so that the surface 104 of object 102 has a desired contour. The fabrication process may also form bumps, indentations, or other contours on the surface 104 of object 102. One exemplary fabrication process may utilize a press brake, which is a tool that is used to bend sheets of material.

It may be desirable to monitor the progress of the fabrication process when forming object 102. The progress of the fabrication process may be monitored by measuring the surface 104 of object 102 and providing real-time feedback of the measurements to an entity that controls the fabrication process. That way, the end result of the fabrication process will be a contour on surface 104 that matches an intended design (e.g., a CAD design).

Progress of the fabrication process is monitored in the following embodiments with a measurement system 110. Measurement system 110 is installed as illustrated in FIG. 1 to measure the surface 104 of object 102 at intermediate times during the fabrication process. Measurement system 110 includes a videogrammetry device 112, a laser projector device 114, and a controller 116. Videogrammetry device 112 comprises any components or systems that are able to capture video images of an object, and determine the object's geometry from the images. Videogrammetry device 112 as described herein captures video images as opposed to still images, so it is referred to as a "videogrammetry" device as opposed to a "photogrammetry" device. Although not specifically shown in FIG. 1, videogrammetry device 112 includes a video camera and any other components for processing the video images captured by the camera.

Laser projector device 114 comprises any components or systems that are able to direct laser beams toward the surface 104 of object 102, and determine the angles at which the laser beams are directed toward the surface 104. Laser projector device 114 includes a laser element 120 mounted on a two-axis gimbal assembly 122. Gimbal assembly 122 is able to tilt and rotate laser element 120 at precise angles in order to direct laser beams at desired points on the surface 104 of object 102. Laser projector device 114 further includes rotary motors and encoders (not shown) that actuate gimbal assembly 122 to precisely measure and control the projection angles of laser element 120 toward the surface 104 of object 102.

Controller 116 comprises any component or device that is able to process data from videogrammetry device 112 and laser projector device 114 to determine the contour of an object's surface. Controller 116 is connected to videogrammetry device 112 and laser projector device 114 through some type of communication medium, such as a wired connection or wireless connection.

To measure the surface 104 of object 102, videogrammetry device 112 is mounted or installed at a fixed location relative to object 102 with a clear line of site to the surface 104 of object 102 being measured. A single camera of videogrammetry device 112 is pointed towards the surface 104 of object 102 so that the surface 104 being measured is within the field of view of the camera (as is illustrated in FIG. 1 by dashed lines). Because the surface 104 being measure is within the field of view of the camera, videogrammetry device 112 may be stationary during measurements.

Laser projector device 114 is also mounted or installed at a fixed location relative to object 102 with a clear line of site to the surface 104 of object 102 being measured. Although laser projector device 114 has a fixed location, laser projector device 114 can direct laser beams at different points along surface 104 of object 102. The gimbal assembly 122 of laser projector device 114 is able to aim the laser beams from laser element 120 at virtually any desired point on the surface 104 of object 102

With measurement system 110 installed as shown in FIG. 1, videogrammetry device 112 and laser projector device 114 are able to operate in conjunction with one another to take measurements of surface 104. For example, assume that the fabrication process has performed an operation to bend object 102 into the shape shown in FIG. 1. After this operation, measurement system 110 may measure the surface 104 of object 102 to determine whether the surface 104 has been properly formed. An exemplary process for measuring the surface 104 of object is described in FIG. 2.

Figure 2:
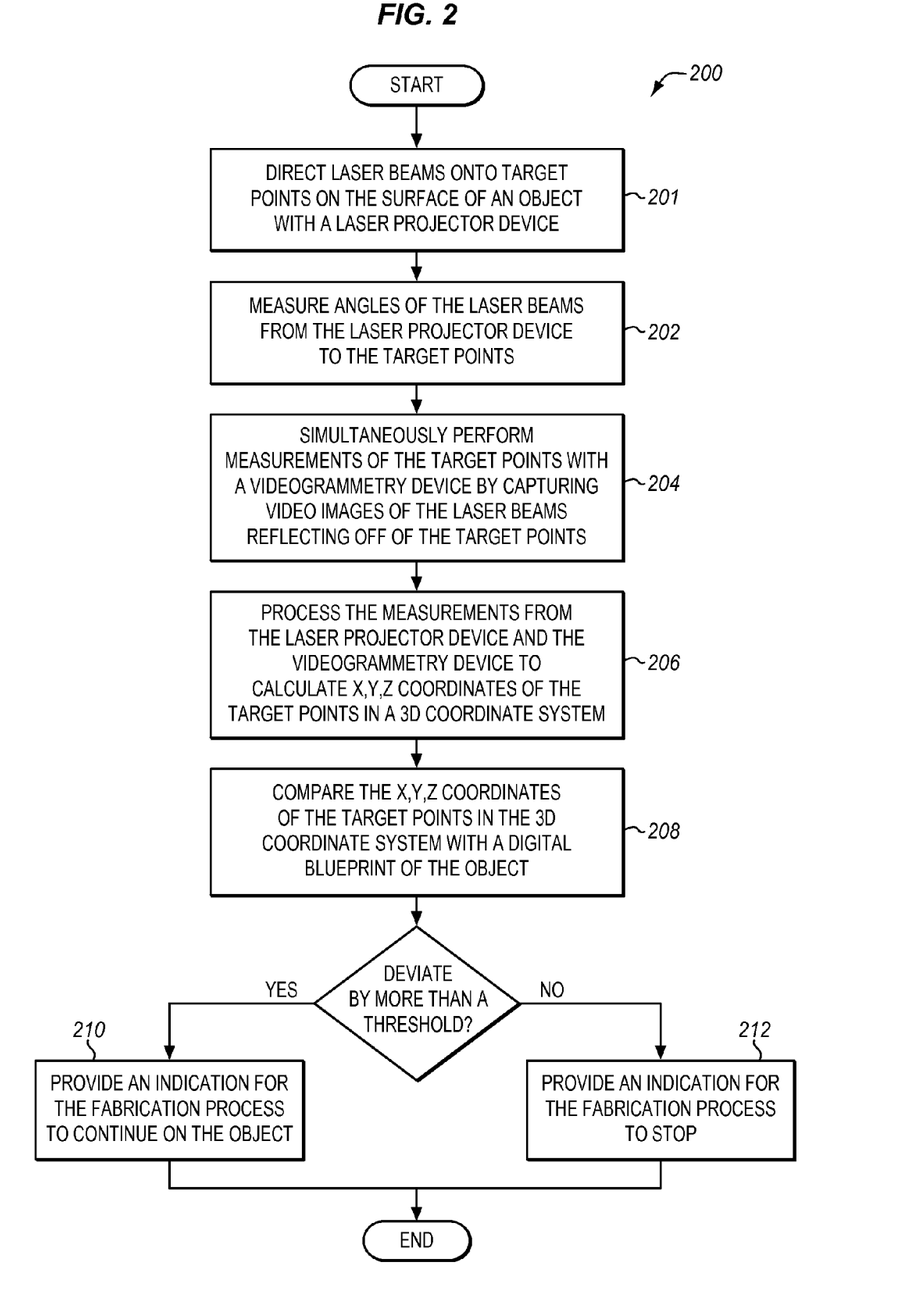
FIG. 2 is a flow chart illustrating a method of measuring the surface of an object in an exemplary embodiment.

FIG. 2 is a flow chart illustrating a method 200 of measuring the surface of an object in an exemplary embodiment. The steps of method 200 will be described with respect to measurement system 110 of FIG. 1, although one skilled in the art will understand that the methods described herein may be performed by other devices or systems not shown. The steps of the methods described herein are not all inclusive and may include other steps not shown. The steps for the flow charts shown herein may also be performed in an alternative order.

Figure 3:
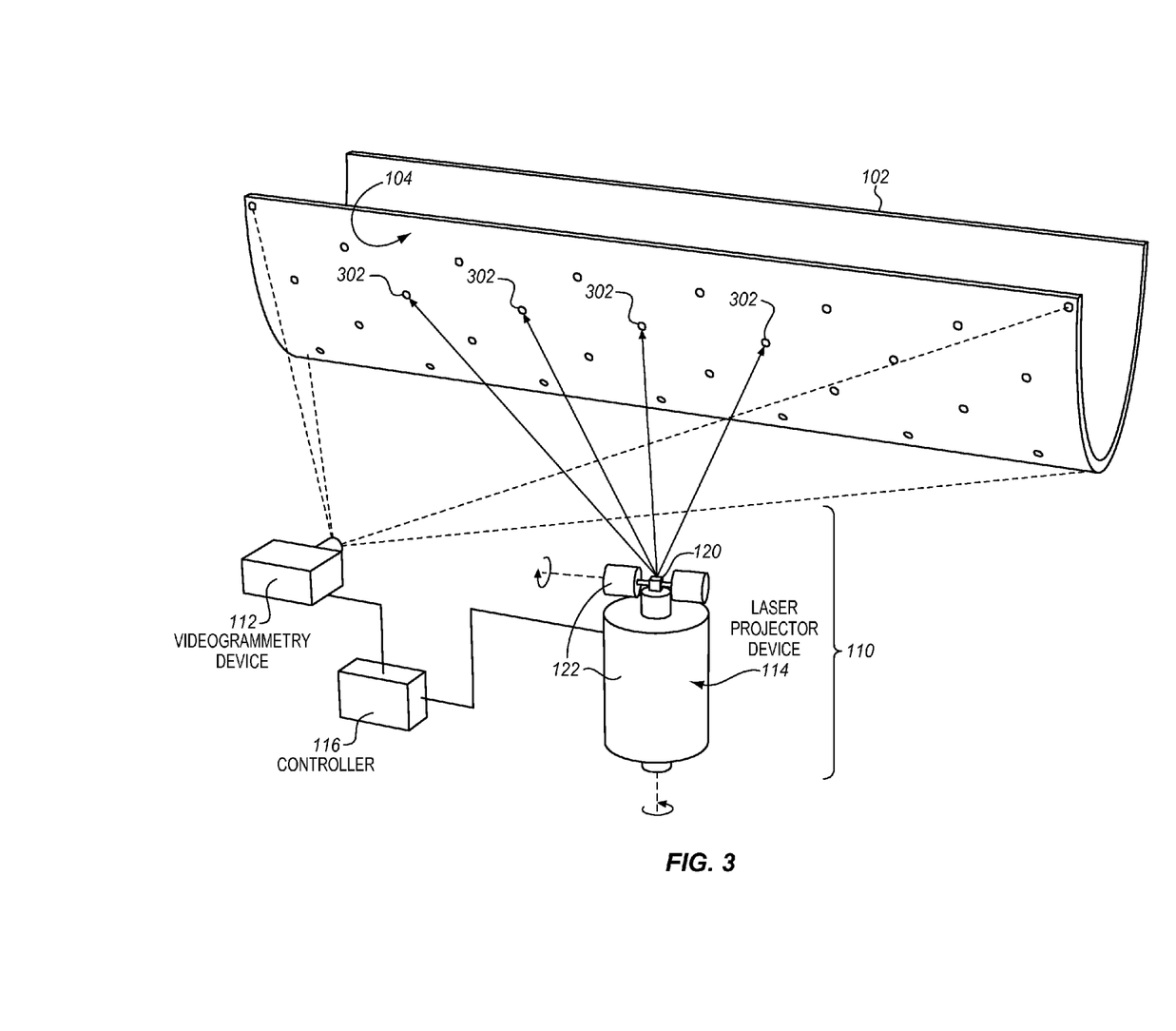
FIG. 3 illustrates a laser projector device directing laser beams onto target points on an object in an exemplary embodiment.

In step 201, laser projector device 114 controls gimbal assembly 122 to direct laser beams from laser element 120 onto target points on the surface 104 of object 102. FIG. 3 illustrates laser projector device 114 directing laser beams onto the target points in an exemplary embodiment. The target points in FIG. 3 are illustrated by reference numbers 302. Gimbal assembly 122 is able to precisely control which target points 302 are illuminated by laser element 120.

In step 202 (see FIG. 2), laser projector device 114 (or controller 116) measures angles (e.g., azimuth and elevation) of the laser beams from laser element 120 to the target points 302 on the surface 104 of object 102. For example, when the rotary motors rotate and/or tilt the gimbal assembly 122 to direct a laser beam onto a target point 302, laser projector device 114 (or controller 116) is able to determine the angle settings of the rotary encoders for that target point 302. Thus, laser projector device 114 is able to determine an angle measurement for that target point 302. Laser projector device 114 can perform this measurement for multiple target points 302 on the surface 104 of object 102.

In step 204, videogrammetry device 112 simultaneously performs measurements of the target points 302 on the surface 104 of object 102 by capturing video images of the laser beams (from laser projector device 114) reflecting off of the target points 302. The laser beams emitted from laser projector device 114 are of a frequency that can be sensed by videogrammetry device 112. Videogrammetry device 112 may use optical filters to enhance the "visibility" of the laser beam reflections in the video images. Because the laser beams from laser projector device 114 are detectable, videogrammetry device 112 is able to capture a video image of the target points 302 being illuminated by the laser beams while laser projector device 114 is performing angle measurements. Thus, videogrammetry device 112 and laser projector device 114 are essentially performing measurements on the target points 302 at the same time.

Both laser projector device 114 and videogrammetry device 112 may be under the control of controller 116. For instance, controller 116 may provide instructions or control messages to laser projector device 114 and videogrammetry device 112 to direct these instruments how or when to measure the surface 104 of object 102. Controller 116 also receives output data from laser projector device 114 and videogrammetry device 112, which indicates the results of the measurements taken by these instruments.

In step 206, controller 116 processes the (angle) measurements from laser projector device 114 and videogrammetry device 112 to calculate x, y, z coordinates of the target points 302 in a three-dimensional (3D) coordinate system. Laser projector device 114 and videogrammetry device 112 comprise a stereo triangulation pair in relation to object 102. The relative, fixed locations of laser projector device 114 and videogrammetry device 112 form one side of a triangle (as the distance between these instruments is known). The line of sight of laser projector device 114 to a target point 302, and the line of sight from videogrammetry device 112 to the same target point 302 form the other two sides of the triangle. Therefore, controller 116 is able to calculate a position (x, y, z coordinate) for each target point 302 on surface 104 in the 3D coordinate system.

In step 208, controller 116 compares the x, y, z coordinates of the target points 302 in the 3D coordinate system with a digital blueprint of object 102. When the design for object 102 is engineered, the desired contour for the surface 104 of object 102 may be represented in a digital blueprint, such as a CAD file. Controller 116 may compare the x, y, z coordinates of the target points 302 in the 3D coordinate system to the engineered design for object 102 to determine if the present contour of surface 104 matches the desired contour for surface 104 (within an allowable tolerance).

Figure 4:
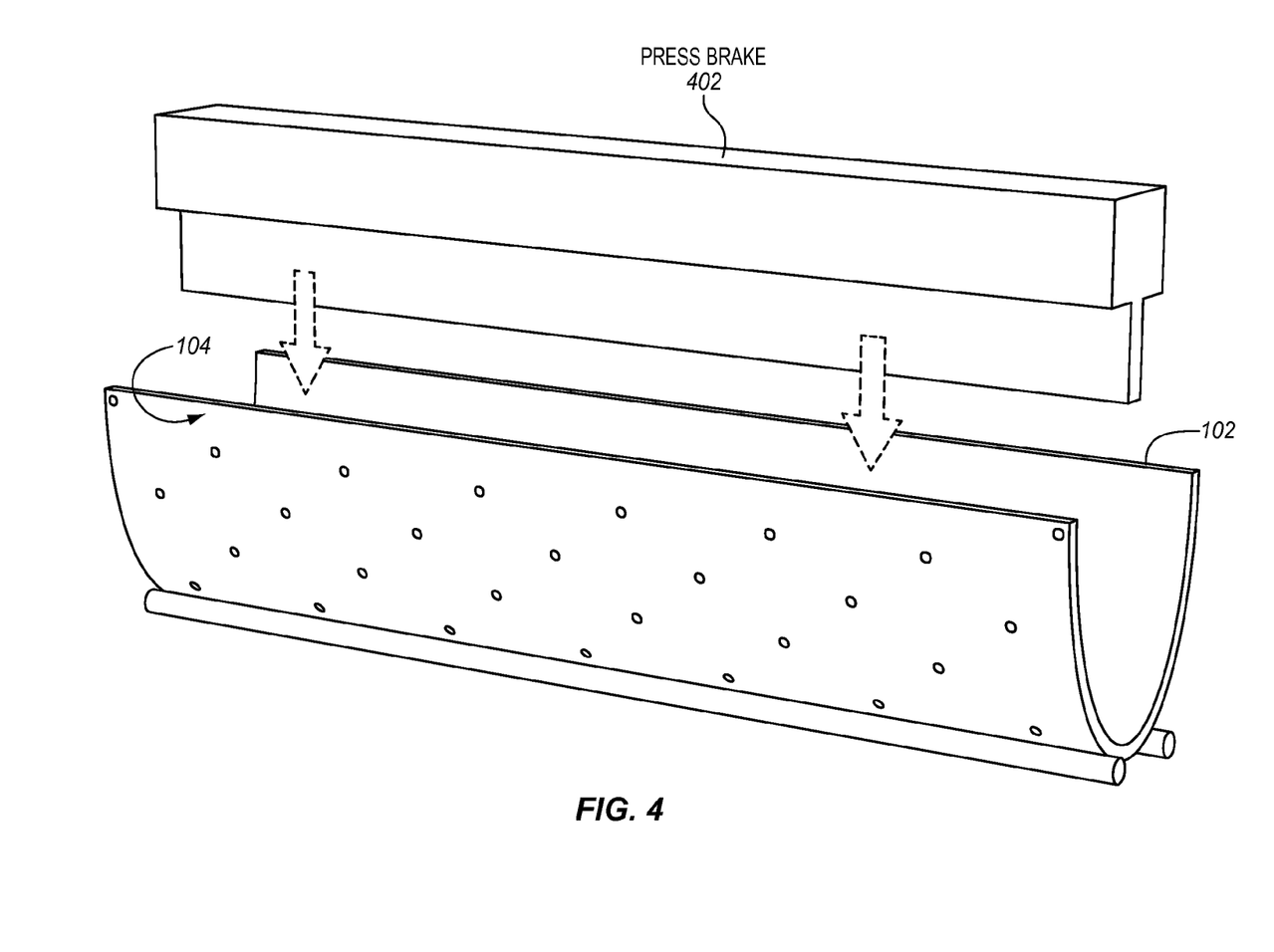
FIG. 4 illustrates the fabrication process continuing to form the shape of object 102 in an exemplary embodiment.

If the x, y, z coordinates of the target points 302 deviate from the digital blueprint by more than a threshold amount, then controller 116 provides an indication for the fabrication process to continue on object 102 in step 210. For example, controller 116 may provide an indication to an automated control system for the fabrication process to perform another iteration of the process. Controller 116 may also indicate an amount of deviation between the x, y, z coordinates of the target points 302 and the digital blueprint of object 102 so that the fabrication process can be adjusted accordingly. Another iteration of the fabrication may then commence based on the indication from controller 116. FIG. 4 illustrates the fabrication process continuing to form the shape of object 102 in an exemplary embodiment. In this embodiment, the fabrication process utilizes a press brake to further form object 102, but other fabrication processes may be used in other embodiments.

If the x, y, z coordinates of the target points 302 do not deviate from the digital blueprint by more than a threshold amount, then controller 116 provides an indication for the fabrication process to stop in step 212. The assumption at this point is that the contour of the surface 104 of object 102 matches the desired contour for object 102 within an acceptable tolerance. Therefore, the fabrication process is complete.

The measurement process described in FIG. 2 is able to measure the surface 104 of object 102 at intermediate times during the fabrication process without interfering with the fabrication process. Also, laser projector device 114 and videogrammetry device 112 are able to simultaneously measure target points on the surface 104 of object 102, which reduces the measurement time. Therefore, the measurement process does not hinder production efficiency goals, and can actually expedite the fabrication process.

Figure 5:
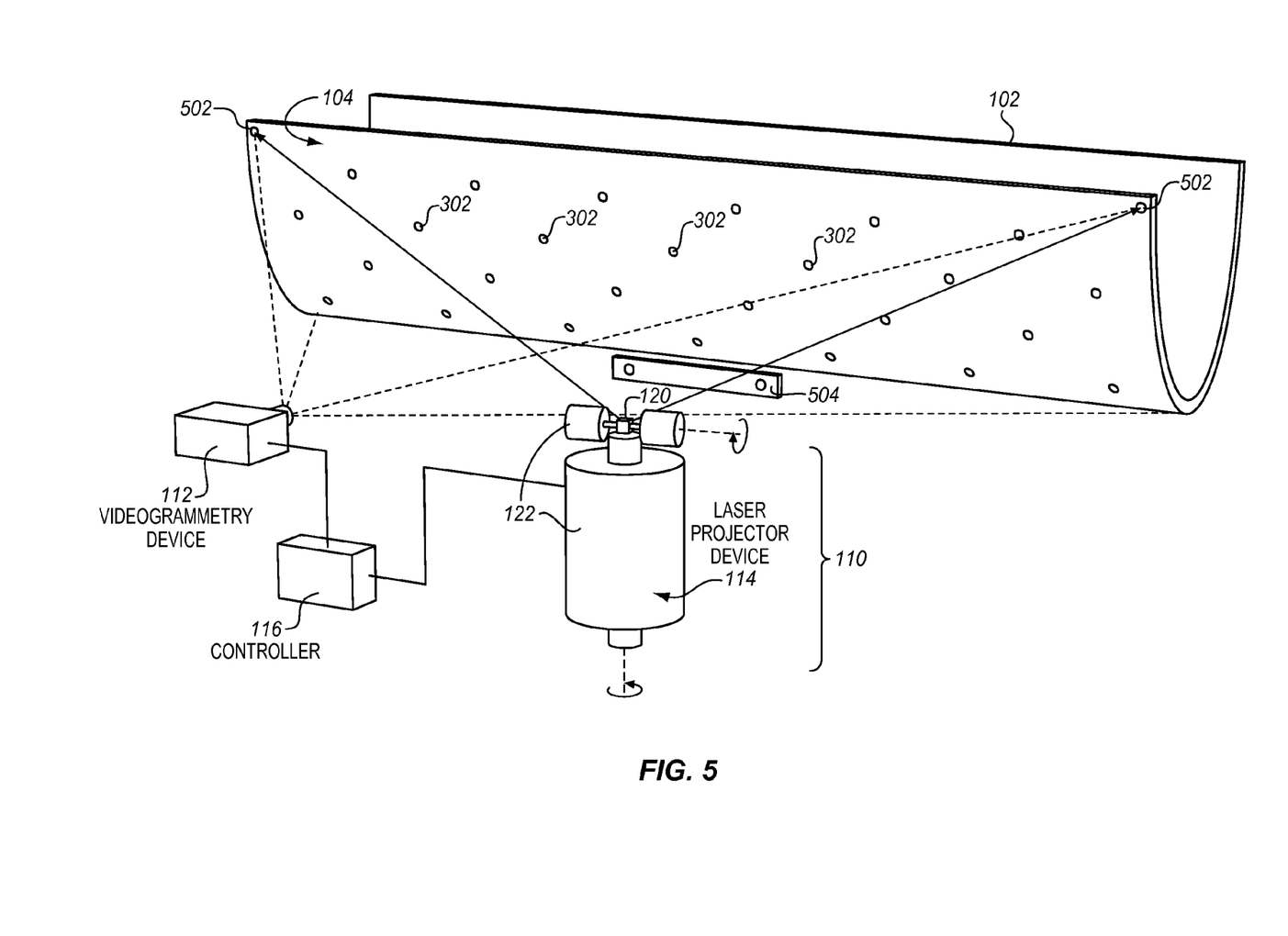
FIG. 5 illustrates calibration of a measurement system in an exemplary embodiment.

In order for measurement system 110 to provide accurate measurements, the system may be calibrated before or during the measurement process. FIG. 5 illustrates calibration of measurement system 110 in an exemplary embodiment. As part of the calibration, multiple reference points 502 are defined on the surface 104 of object 102. Videogrammetry device 112 captures the reference points 502 in the video images, and uses the reference points 502 as "fix points". Videogrammetry device 112 can then determine the positions of the target points 302 with respect to the reference points 502 so that the measurements of the target points 302 are calibrated based on the reference points 502.

Additionally, a scale bar 504 may be placed in the field of view of videogrammetry device 112. Scale bar 504 includes two or more points having a calibrated distance between them. The scale bar 504 sets the length scale for the triangulation calculation. Other calibration techniques may be used so that measurement system 110 can provide the most accurate measurements.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope is not limited to those specific embodiments. Rather, the scope is defined by the following claims and any equivalents thereof.

The invention claimed is:

1. An apparatus comprising:
a measurement system configured to monitor the progress of a fabrication process used to contour a surface of an object by performing measurements on the surface of the object at intermediate times during the fabrication process, the measurement system comprising:
 a laser projector device mounted at a first fixed location relative to the object being formed by the fabrication process, wherein the laser projector device includes a laser element mounted on a two-axis gimbal assembly;
 a videogrammetry device mounted at a second fixed location relative to the object; and
 a controller;
 wherein the laser projector device is configured to control the two-axis gimbal assembly to direct laser beams from the laser element onto target points on the surface of the object, and to determine angle measurements for the target points based on angles of the laser element in directing the laser beams onto the target points, wherein the angle measurements are determined based on a position of a rotary encoder connected to the two-axis gimbal assembly;
 wherein the videogrammetry device is configured to simultaneously determine angle measurements for the target points by capturing video images of the laser beams reflecting off of the target points;
 wherein the controller is configured to process the angle measurements from the laser projector device and the angle measurements from the videogrammetry device to calculate x, y, z coordinates of the target points in a three-dimensional (3D) coordinate system;
 wherein the controller is configured to compare the x, y, z coordinates of the target points in the 3D coordinate system with a digital blueprint of the object to determine if a present contour of the surface of the object matches a desired contour of the surface of the object within a tolerance, to provide an indication for the fabrication process to continue on the object if the x, y, z coordinates of the target points deviate from the digital blueprint by more than a threshold amount, and to provide an indication for the fabrication process to stop if the x, y, z coordinates of the target points do not deviate from the digital blueprint by more than the threshold amount.

2. The apparatus of claim 1 wherein:
the controller is configured to provide an indication to an automated control system to perform another iteration of the fabrication process if the x, y, z coordinates of the target points deviate from the digital blueprint by more than the threshold amount.

3. The apparatus of claim 1 wherein:
the controller is configured to indicate an amount of deviation between the x, y, z coordinates of the target points and the digital blueprint to adjust the fabrication process.

4. The apparatus of claim 1 wherein:
the videogrammetry device is configured to capture a scale bar in the video images along with the laser beams reflecting off of the target points.

5. The apparatus of claim 1 wherein:
the videogrammetry device comprises a single camera that captures video images as opposed to still images.

6. The apparatus of claim 1 wherein:
the object comprises a section of an aircraft.

7. The apparatus of claim 1 wherein:
the controller is configured to further process a known distance between the laser projector device and the videogrammetry device to calculate the x, y, z coordinates of the target points.

8. A method of monitoring the progress of a fabrication process used to contour a surface of an object, the method comprising:
performing measurements on the surface of the object at intermediate times during the fabrication process by:
 directing laser beams onto target points on the surface of the object with a laser projector device having a laser element mounted on a two-axis gimbal assembly, wherein the laser projector device is mounted at a first fixed location relative to the object;
 determining angle measurements for the target points based on angles of the laser element in directing the laser beams onto the target points, wherein the angle measurements are determined based on a position of a rotary encoder connected to the two-axis gimbal assembly;
 simultaneously determining angle measurements for the target points with a videogrammetry device by capturing video images of the laser beams reflecting off of the target points, wherein the videogrammetry device is mounted at a second fixed location relative to the object; and
 processing the angle measurements from the laser projector device and the angle measurements from the videogrammetry device to calculate x, y, z coordinates of the target points in a three-dimensional (3D) coordinate system;
comparing the x, y, z coordinates of the target points in the 3D coordinate system with a digital blueprint of the object to determine if a present contour of the surface of the object matches a desired contour of the surface of the object within a tolerance;
providing an indication for the fabrication process to continue on the object if the x, y, z coordinates of the target points deviate from the digital blueprint by more than a threshold amount; and
providing an indication for the fabrication process to stop if the x, y, z coordinates of the target points do not deviate from the digital blueprint by more than the threshold amount.

9. The method of claim 8 wherein providing the indication for the fabrication process to continue comprises:
providing an indication to an automated control system to perform another iteration of the fabrication process.

10. The method of claim 8 further comprising:
indicating an amount of deviation between the x, y, z coordinates of the target points and the digital blueprint to adjust the fabrication process.

11. The method of claim 8 further comprising:
capturing a scale bar in the video images along with the laser beams reflecting off of the target points.

12. The method of claim 8 wherein directing the laser beams onto the target points on the surface of the object with the laser projector device comprises:

controlling the two-axis gimbal assembly in the laser projector device to direct the laser beams from the laser element onto the target points.

13. The method of claim 8 wherein directing the laser beams onto the target points on the surface of the object with the laser projector device comprises:

directing the laser beams onto the target points on a surface of an aircraft section.

14. The method of claim 8 wherein processing the angle measurements from the laser projector device and the angle measurements from the videogrammetry device to calculate x, y, z coordinates of the target points further comprises:

processing a known distance between the laser projector device and the videogrammetry device to calculate the x, y, z coordinates of the target points.

15. A system comprising:

a measurement system configured to monitor the progress of a fabrication process used to contour a surface of an object by performing measurements on the surface of the object at intermediate times during the fabrication process, and to provide real-time feedback of the measurements to an automated control system for the fabrication process;

the measurement system comprising:

a laser projector device mounted at a first fixed location relative to the object to perform angle measurements of target points on a surface of the object;

a videogrammetry device mounted at a second fixed location relative to the object to perform angle measurements of the target points simultaneously with the angle measurements by the laser projector device; and a controller configured to process the angle measurements from the laser projector device and the angle measurements from the videogrammetry device to calculate coordinates of the target points in a three-dimensional (3D) coordinate system, to compare the coordinates of the target points in the 3D coordinate system with a digital blueprint of the object to determine if a present contour of the surface of the object matches a desired contour of the surface of the object within a tolerance, and to provide an indication to the automated control system to perform another iteration of the fabrication process if the coordinates of the target points deviate from the digital blueprint by more than a threshold amount.

16. The system of claim 15 wherein:

the controller is configured to provide an indication to the automated control system to stop the fabrication process if the coordinates of the target points do not deviate from the digital blueprint by more than the threshold amount.

17. The system of claim 15 wherein:

the laser projector device includes a laser element mounted on a two-axis gimbal assembly;

the laser projector device is configured to control the two-axis gimbal assembly to direct laser beams from the laser element onto the target points on the surface of the object, and to perform the angle measurements of the target points based on angles of the laser element in directing the laser beams onto the target points, wherein the angle measurements are determined based on a position of a rotary encoder connected to the two-axis gimbal assembly; and the videogrammetry device is configured to simultaneously perform the angle measurements of the target points by capturing video images of the laser beams reflecting off of the target points.

18. The system of claim 15 wherein:

the videogrammetry device is configured to capture reference points on the surface of the object, and to calibrate the measurements of the target points based on the reference points.

* * * * *